United States Patent
Chaudhry et al.

(10) Patent No.: US 8,601,240 B2
(45) Date of Patent: Dec. 3, 2013

(54) SELECTIVELY DEFERING LOAD INSTRUCTIONS AFTER ENCOUNTERING A STORE INSTRUCTION WITH AN UNKNOWN DESTINATION ADDRESS DURING SPECULATIVE EXECUTION

(75) Inventors: Shailender Chaudhry, San Francisco, CA (US); Martin R. Karlsson, San Francisco, CA (US); Gideon N. Levinsky, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 478 days.

(21) Appl. No.: 12/773,661

(22) Filed: May 4, 2010

(65) Prior Publication Data
US 2011/0276791 A1 Nov. 10, 2011

(51) Int. Cl.
*G06F 9/312* (2006.01)

(52) U.S. Cl.
USPC ........................................ 712/216; 712/225

(58) Field of Classification Search
USPC ................. 712/216–219, 225, 229, 244, 245; 711/138, 140, 169, 201, 214, 215; 708/233
See application file for complete search history.

(56) References Cited

U.S. PATENT DOCUMENTS

| | | | |
|---|---|---|---|
| 5,606,670 A * | 2/1997 | Abramson et al. | 711/154 |
| 5,615,350 A * | 3/1997 | Hesson et al. | 712/218 |
| 5,751,983 A * | 5/1998 | Abramson et al. | 712/216 |
| 5,903,768 A * | 5/1999 | Sato | 712/1 |
| 5,987,595 A * | 11/1999 | Yoaz et al. | 712/216 |
| 6,108,770 A * | 8/2000 | Chrysos et al. | 712/216 |
| 6,430,649 B1 * | 8/2002 | Chaudhry et al. | 711/100 |
| 6,662,280 B1 * | 12/2003 | Hughes | 711/156 |
| 6,694,424 B1 * | 2/2004 | Keller et al. | 712/216 |
| 6,959,925 B1 * | 11/2005 | Baker et al. | 273/149 R |
| 7,114,060 B2 * | 9/2006 | Chaudhry et al. | 712/219 |
| 7,181,598 B2 * | 2/2007 | Jourdan et al. | 712/217 |
| 7,257,699 B2 * | 8/2007 | Chaudhry et al. | 712/219 |
| 7,263,603 B2 * | 8/2007 | Chaudhry et al. | 712/228 |
| 7,293,161 B1 * | 11/2007 | Chaudhry et al. | 712/216 |
| 7,461,238 B2 * | 12/2008 | Luick | 712/216 |
| 7,594,100 B2 * | 9/2009 | Cypher et al. | 712/225 |
| 7,603,527 B2 * | 10/2009 | Hily et al. | 711/158 |
| 7,904,664 B2 * | 3/2011 | Tremblay et al. | 711/145 |
| 8,019,975 B2 * | 9/2011 | Brashears et al. | 712/225 |
| 2003/0065909 A1 * | 4/2003 | Jourdan | 712/216 |
| 2004/0133767 A1 * | 7/2004 | Chaudhry et al. | 712/225 |
| 2005/0216705 A1 * | 9/2005 | Shibayama et al. | 712/216 |
| 2006/0095734 A1 * | 5/2006 | Filippo et al. | 712/218 |
| 2007/0226470 A1 * | 9/2007 | Krimer et al. | 712/225 |

OTHER PUBLICATIONS

Lee et al., "Branch Prediction Strategies and Branch Target Buffer Design" Computer 17.1, Jan. 1, 1984, 6-22.*

(Continued)

*Primary Examiner* — Andrew Caldwell
*Assistant Examiner* — Yuqing Xiao
(74) *Attorney, Agent, or Firm* — Park, Vaughan, Fleming & Dowler LLP

(57) ABSTRACT

The described embodiments provide a system for executing instructions in a processor. While executing instructions in an execute-ahead mode, the processor encounters a store instruction for which a destination address is unknown. The processor then defers the store instruction. Upon encountering a load instruction while the store instruction with the unknown destination address is deferred, the processor determines if the load instruction is to continue executing. If not, the processor defers the load instruction. Otherwise, the processor continues executing the load instruction.

18 Claims, 7 Drawing Sheets

(56) References Cited

OTHER PUBLICATIONS

Yoaz et al., "Speculation Techniques for Improving Load Related Instruction Scheduling" Conference Proceedings -Annual International Symposium on Computer Architecture, IEEE, Jan. 1, 1999 p. 42-53.*

Roesner et al., "Counting Dependence Predictors" 35th International Symposium on Computer Architecture, p. 215-26, IEEE 2009.*

Moshovos et al., "Dynamic Speculation and Synchronization of Data Dependencies" Computer Architecture News, 181-93, USA:ACM, May 1997.*

Calder et al., "A comparative Survey of Load Speculation Architectures" Journal of Instruction-Level Parallelism 1 (2000) 1-39, published May 2000.*

Sato, "Sepculative Resulution of Ambigous Memory Aliasing" IEEE, Proceedings of IWIA'97, Oct. 22-24, 1997.*

* cited by examiner

BANK PREDICTION TABLE 504

| STORE IDENTIFIER 530 | BANK ID 532 |
|---|---|
|  |  |
|  |  |
|  |  |
|  |  |
|  |  |
|  |  |
|  |  |
|  |  |

FIG. 5C

LOAD RAW PREDICTION TABLE 600

| LOAD IDENTIFIER 604 | RAW BIT 606 |
|---|---|
|  |  |
|  |  |
|  |  |
|  |  |
|  |  |
|  |  |

ENTRY 602

FIG. 6

SELECTIVELY DEFERRING LOAD INSTRUCTIONS AFTER ENCOUNTERING A STORE INSTRUCTION WITH AN UNKNOWN DESTINATION ADDRESS DURING SPECULATIVE EXECUTION

BACKGROUND

1. Field

The described embodiments relate to computer systems. More specifically, the described embodiments relate to techniques for handling store instructions with unknown destination addresses during speculative execution.

2. Related Art

Some modern microprocessors support speculative execution of program code. This generally involves executing instructions speculatively while preserving a pre-speculation architectural state of the processor. The processor can discard speculative results and return to the pre-speculation architectural state if certain conditions occur during speculative execution (e.g., encountering an error/trap, a coherence violation, unavailability of processor hardware resources, executing certain types of instructions, etc.). If the speculative execution completes without encountering one of the conditions, the processor can commit the speculative results to the architectural state and continue with normal, non-speculative execution.

Some of these processors support an execute-ahead mode and a deferred-execution mode for speculatively executing instructions. In these processors, upon encountering an instruction with an unresolved data dependency while executing instructions in a non-speculative normal-execution mode, the processor defers the instruction by placing the instruction into a deferred queue and marking the destination register of the instruction "not there" to indicate that the register is awaiting a result from a deferred instruction. The processor then transitions to the execute-ahead mode to speculatively execute subsequent instructions. During the execute-ahead mode, instructions with unresolved dependencies are deferred, but instructions without unresolved data dependencies are executed in program order. When a data dependency is eventually resolved (e.g., data returns from a cache), the processor can transition to the deferred-execution mode, during which instructions in the deferred queue are issued in program order for execution. In these processors, unless one of the above-described conditions is encountered, upon executing all deferred instructions, the processor can join the speculative results to an architectural state of the processor and resume execution in a normal-execution mode.

Some of these processors also support a scout mode. In these processors, upon encountering one of the above-described conditions while speculatively executing program code, the processor can transition to the scout mode and can execute program code in the scout mode until any data dependencies are resolved. The processor then restores the pre-speculation architectural state and resumes operation in the normal-execution mode. During the scout mode, the processor executes memory operations to pre-fetch data for the subsequent re-execution of the program code in normal-execution mode, but does not commit any speculative results to the architectural state of the processor. Although scout mode enables these processors to perform useful work during a stall condition, the processors are forced to re-execute the program code upon resuming the pre-speculation architectural state and resuming operation in normal-execution mode.

One of the conditions that can cause some of these processors to transition from execute-ahead mode to scout mode occurs when the processor encounters a load following a store with an unknown address. For example, processor can execute a first load instruction to load a register with a value that is then to be used to compute the address for a store instruction. Assuming the first load instruction misses in the L1 cache, the processor defers the first load instruction and sets a bit in the destination register for the first load instruction to mark the destination register as "not there." The processor can then encounter a subsequent store instruction that uses the value in the not-there register as an input for computing a destination address for the store. However, because the register is not there, the processor cannot resolve the address for the store. Thus, the store instruction is deferred and an entry is made in the store buffer that indicates that a store operation with an unknown destination address is outstanding (i.e., has been deferred). When the processor encounters a subsequent load instruction during speculative execution, the processor immediately transitions to scout mode. As described above, the transition to scout mode means that the processor will eventually restore the checkpoint and re-execute all of the speculatively executed instructions, which can mean that the processor is duplicating a significant amount of computational work.

In order to avoid restoring the checkpoint and hence duplicating the computational work, some processors simply defer all load instructions following a store with an unknown address and continue to operate in execute-ahead mode. However, because load instructions are common in program code, this can lead to a large number of instructions being deferred (i.e., both load instructions and instructions that are dependent on deferred load instructions). Because the deferred queue in these processors is typically limited in size, forcing the deferral of the load instructions and the instructions that depend from them can cause the deferred queue to overflow, which in turn leads the processor to immediately restore the pre-speculation architectural state and resume operation in the normal-execution mode (thereby discarding all speculatively-performed computational work).

SUMMARY

The described embodiments provide a system for executing instructions in a processor. While executing instructions in an execute-ahead mode, the processor encounters a store instruction for which a destination address is unknown. The processor then defers the store instruction. Upon encountering a load instruction while the store instruction with the unknown destination address is deferred, the processor determines if the load instruction is to continue executing. If not, the processor defers the load instruction. Otherwise, the processor continues executing the load instruction.

In some embodiments, when determining if the load instruction is to continue executing, the processor predicts a destination address for the store instruction or predicts a set of addresses in which the destination address may be included. The processor then compares an address of the load instruction with the predicted destination address or set of addresses to determine if the address for the load instruction matches the destination address or one of the addresses in the set of addresses. If the address for the load instruction matches the destination address or one of the addresses in the set of addresses, the processor defers the load instruction. Otherwise, the processor continues executing the load instruction.

In some embodiments, the processor maintains a list of one or more previously-executed store instructions. In these embodiments, each entry in the list includes the destination address for a corresponding previously-executed store instruction. In these embodiments, when predicting the destination address for the store instruction, the processor checks the list for an entry that matches the store instruction. If an entry for the store instruction is found in the list, the processor uses the destination address in the entry as the predicted destination address.

In some embodiments, the processor includes a store queue. In these embodiments, the processor can update an entry in the store queue to indicate that the store instruction with the unknown destination address has been deferred.

In some embodiments, the store queue includes a memory for buffering stores that is divided into two or more banks. In these embodiments, when updating an entry in the store queue for a buffered store operation, the processor determines a bank in which the entry is located and updates an entry in the determined bank. In these embodiments, when determining if the load instruction is to continue executing, the processor determines if the load instruction would retrieve data from a bank in the store queue in which a record of a store to an unknown destination address is located. If so, the processor defers the load instruction. Otherwise, the processor continues executing the load instruction.

In some embodiments, the entry in the store queue includes a record of one or more features of the store instruction. In these embodiments, when determining if the load instruction is to continue executing, the processor checks the entry in the store queue to determine if one or more features of the load instruction substantially match one or more features of the store to the unknown destination address. If the one or more features of the load instruction substantially match the one or more features of the store to the unknown destination address, the processor defers the load instruction. Otherwise, the processor continues executing the load instruction.

In some embodiments, when determining if the load instruction is to continue executing, the processor determines if a predetermined number of entries have been updated in the store queue to indicate "there" stores (i.e., stores for which the destination address is known) since the entry in the store queue was updated to indicate that the store instruction with the unknown destination address had been deferred. If less than the predetermined number of entries has been updated, the processor defers the load instruction. Otherwise, the processor continues executing the load instruction.

In some embodiments, when determining if the load instruction can continue executing, the processor determines if at least one entry in the store queue can be used to provide data for the store instruction. If no entry in the store queue can be used to provide the data (and given that a store with an unknown destination address has already been deferred), the processor defers the load instruction. Otherwise, the processor continues executing the load instruction.

In some embodiments, the processor includes a record of previously-executed load instructions that have encountered a read-after-write hazard. In these embodiments, when determining if the load instruction is to continue executing, the processor checks the record to determine if the load instruction encountered a read-after-write hazard in a previous execution. If the load instruction encountered a read-after-write hazard in a previous execution, the processor defers the load instruction. Otherwise, the processor continues executing the load instruction.

In some embodiments, after receiving a data return that enables the execution of the deferred store instruction, the processor executes the deferred store instruction in a deferred-execution mode. Upon resolving a destination address for the store instruction, the processor determines if the load instruction that continued executing loaded data from the destination address. If so, the processor transitions to a scout mode to execute subsequent instructions. Otherwise, continuing executing in the deferred-execution mode.

BRIEF DESCRIPTION OF THE FIGURES

FIG. 5C presents a block diagram illustrating a bank prediction table in accordance with the described embodiments.

FIG. 6 presents a block diagram illustrating a load read-after-write (RAW) prediction table in accordance with the described embodiments.

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed.

When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Terminology

The following description includes a number of terms for which the definitions are generally known in the art. However, the following definitions are provided to clarify the subsequent description.

The "architectural state" of a processor includes the values, state, and settings that have been committed to corresponding structures on the processor. The values, state, and settings from the architectural state can be freely used by the processor to perform operations. Generally, a processor's architectural state includes the values in all processor structures, memories, registers, flags, variables, counters, and other hardware structures and software variables.

Computer System

Figure 1:
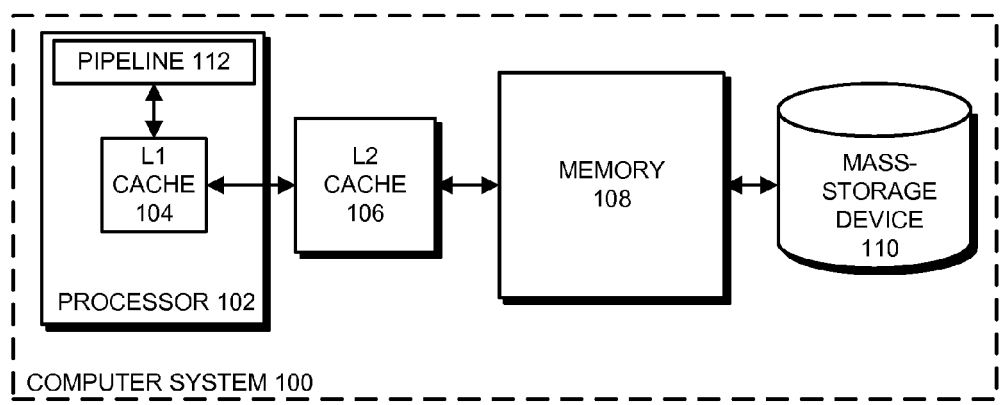
FIG. 1 presents a block diagram illustrating a computer system in accordance with the described embodiments.

FIG. 1 presents a block diagram illustrating a computer system 100 in accordance with the described embodiments. Computer system 100 includes processor 102, L2 cache 106, memory 108, and mass-storage device 110. Processor 102 includes L1 cache 104 and pipeline 112.

Processor 102 can include any device that is configured to perform computational operations. For example, processor 102 can be a central processing unit (CPU) such as a microprocessor. As another example, processor 102 can be a controller or an application-specific integrated circuit (ASIC).

Mass-storage device 110, memory 108, L2 cache 106, and L1 cache 104 are computer-readable storage mediums that collectively form a memory hierarchy in a memory subsystem that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster memories that store copies of frequently used data. For example, memory 108 can be a dynamic random access memory (DRAM) structure that is larger than L1 cache 104 and L2 cache 106, whereas L1 cache 104 and L2 cache 106 can include smaller static random access memories (SRAMs).

Computer system 100 can be incorporated into many different types of electronic devices. For example, computer system 100 can be part of a desktop computer, a laptop, netbook, or tablet computer, a server, a media player, an appliance, a cellular phone, a piece of testing equipment, a network appliance, a calculator, a personal digital assistant (PDA), a hybrid device (i.e., a "smart phone"), a guidance system, a toy, audio/video electronics, a video game system, a control system (e.g., an automotive control system), or another electronic device.

Although we use specific components to describe computer system 100, in alternative embodiments, different components can be present in computer system 100. For example, computer system 100 can include video cards, network cards, optical drives, network controllers, input/output (I/O) devices, and/or other peripheral devices that are coupled to some or all of the elements in computer system 100 using a bus, a network, or another suitable communication channel. In addition, computer system 100 may include more or fewer of the elements shown in FIG. 1. For example, computer system 100 may include additional processors 102, and the processors 102 may share some or all of L2 cache 106, memory 108, and mass-storage device 110 and/or may include some or all of their own memory hierarchy. Moreover, in some embodiments, some or all of the memory hierarchy can be included in other elements in computer system 100. For example, in some embodiments, L1 cache 104 includes a data cache 406 (see FIG. 4) and an instruction cache, and data cache 406 can be included in another element in computer system 100, e.g., in load/store execution unit 400.

Figure 2:
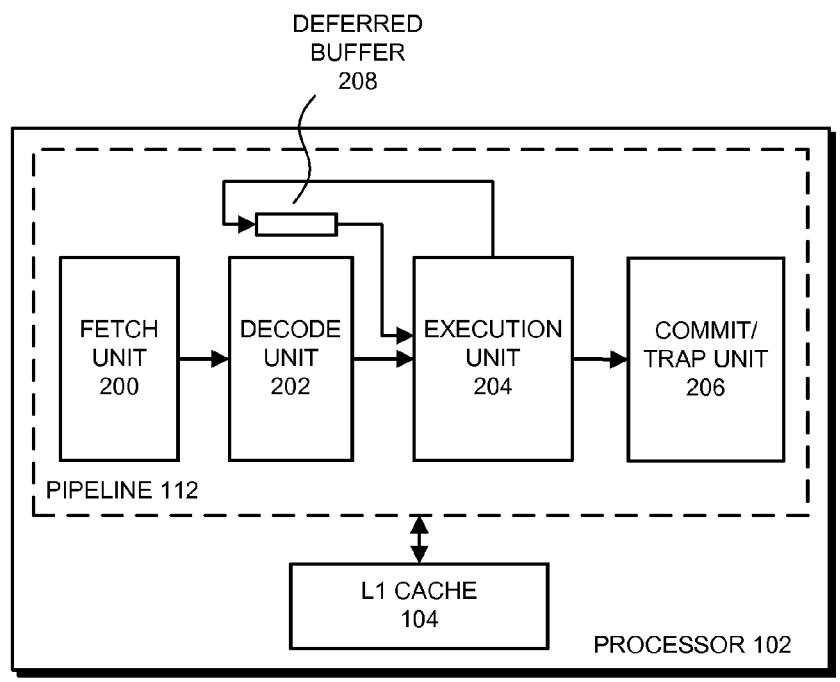
FIG. 2 presents a block diagram illustrating a processor with an expanded view of a pipeline in accordance with the described embodiments.

FIG. 2 presents a block diagram illustrating a processor 102 with an expanded view of pipeline 112 in accordance with the described embodiments. Generally, pipeline 112 is an instruction execution pipeline that includes a number of stages for executing program code. The stages in pipeline 112 are coupled in series, with the output of a given stage coupled to the input of a next stage. Instructions progress through each stage of the pipeline to complete a corresponding part of executing the instruction.

Pipeline 112 includes fetch unit 200, decode unit 202, execution unit 204, and commit/trap unit 206. Fetch unit 200 fetches instructions from L1 cache 104 (or, if necessary, from other levels of the memory hierarchy) for execution. Decode unit 202 decodes the fetched instructions and prepares the instructions for execution by execution unit 204. Execution unit 204 executes the instructions forwarded from decode unit 202. Execution unit 204 can include one or more floating point execution units, integer execution units, branch execution units, and/or memory execution units (e.g., load/store execution units) for executing the instructions. Commit/trap unit 206 retires successfully executed instructions (i.e., commits the results to the architectural state of processor 102 and computer system 100) and handles traps/errors that arise during the execution of instructions.

Pipeline 112 also includes deferred buffer 208. In the described embodiments, if an instruction cannot be executed due to an unresolved data dependency, such as an operand that has not returned from a load operation or a translation lookaside buffer miss, processor 102 defers execution of the instruction and places the instruction into deferred buffer 208. In other words, because the instruction with the unresolved dependency cannot yet be executed by execution unit 204 due to the unresolved data dependency, the instruction is forwarded from execution unit 204 along the path shown in FIG. 2 to deferred buffer 208. When the data dependency is eventually resolved, instructions from deferred buffer 208 are executed in program order with respect to other deferred instructions, but not with respect to other previously executed non-deferred instructions. This process is described in more detail below with reference to FIG. 3.

Note that pipeline 112 is simplified for the purposes of illustration. In alternative embodiments, pipeline 112 can contain other stages (units), functional blocks, mechanisms, and/or circuits. The units, functional blocks, mechanisms, and/or circuits that can be used in a pipeline are known in the art and hence are not described in detail.

In some embodiments, processor 102 includes a checkpoint-generation mechanism (not shown). This checkpoint-generation mechanism includes one or more register files, memories, tables, lists, or other structures that facilitate saving a copy of the architectural state of processor 102. In these embodiments, when commencing speculative execution (e.g., execution in execute-ahead mode 302, or scout mode 306 (see FIG. 3), the checkpoint-generation mechanism can perform operations to checkpoint/preserve the architectural state of processor 102. Generally, the architectural state can include copies of all processor 102's hardware structures, memories, registers, flags, variables, counters, etc., that are useful or necessary for restarting processor 102 from the pre-speculation architectural state.

In some embodiments, the checkpoint-generation mechanism does not immediately copy values to preserve the pre-speculation architectural state. Instead, in these embodiments, the architectural state is only preserved as necessary. For example, before a register, counter, variable, etc., is overwritten or changed during speculative execution, the checkpoint-generation mechanism can preserve a copy. In some embodiments, the checkpoint-generation mechanism is distributed among one or more of the sub-blocks of processor 102.

Figure 3:
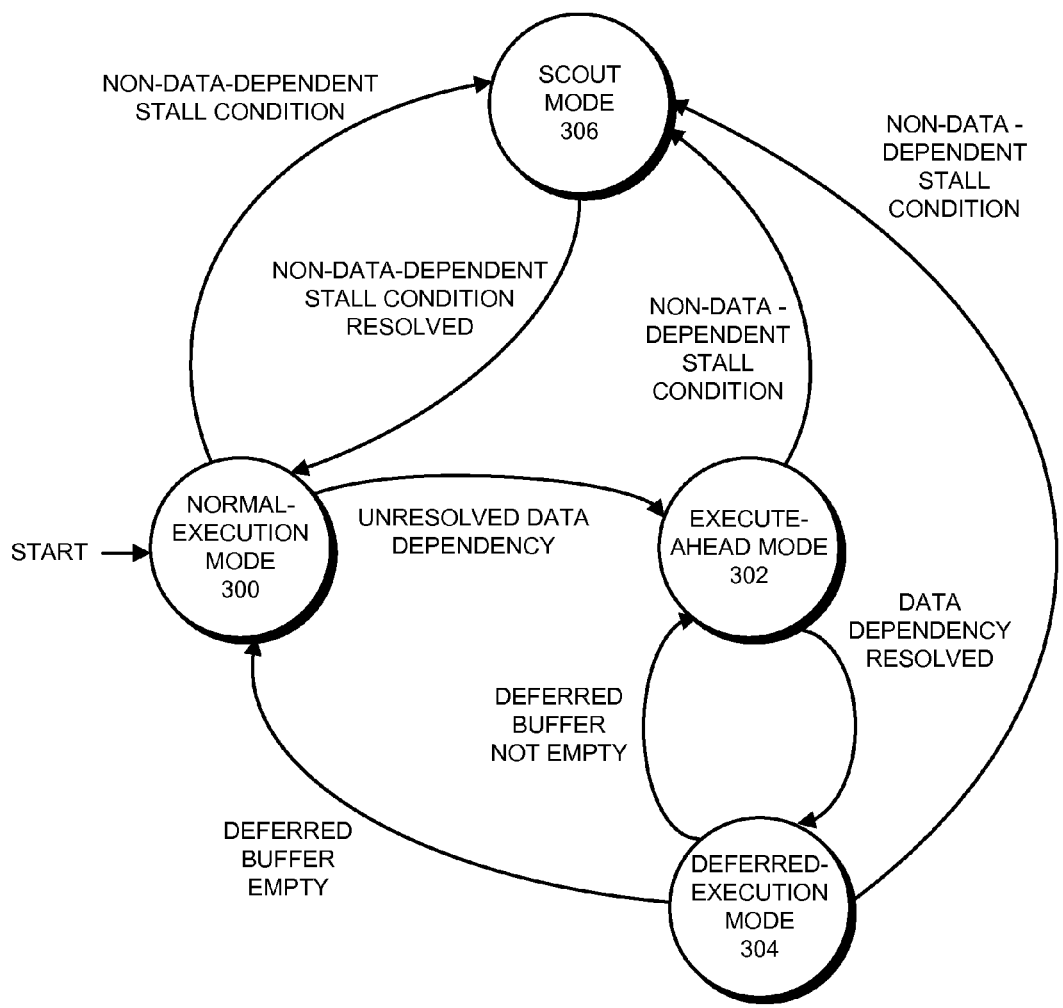
FIG. 3 presents a state diagram which includes a normal-execution mode, an execute-ahead mode, a deferred-execution mode, and a scout mode in accordance with the described embodiments.

In some embodiments, computer system 100 further includes mechanisms (functional blocks, circuits, etc.) for operating in an execute-ahead mode 302, a deferred-execution mode 304, and a scout mode 306 (see FIG. 3). Exemplary embodiments of a system that supports an execute-ahead mode and a deferred-execution mode are described in U.S. Pat. No. 7,114,060, entitled "Selectively Deferring Instructions Issued in Program Order Utilizing a Checkpoint and Multiple Deferral Scheme," by inventors Shailender Chaudhry and Marc Tremblay, which is hereby incorporated by reference to describe some mechanisms and processes of operating in execute-ahead mode and deferred-execution mode. Exemplary embodiments of a system that supports a scout mode are described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay, which is hereby incorporated by reference to describe some mechanisms and processes of operating in scout mode.

Note that, although we provide the above-described references as examples of a system that supports execute-ahead mode and deferred-execution mode, numerous other publications, conference papers, patent publications, and issued patents describe additional aspects of the execute-ahead mode and the deferred-execution mode. See, for example, U.S. Pat. No. 7,293,161, entitled "Deferring Loads and Stores When a Load Buffer or Store Buffer Fills During Execute-Ahead Mode," by inventors Shailender Chaudhry, Marc Tremblay, and Paul Caprioli, or U.S. Pat. No. 7,487,335, entitled "Method and Apparatus for Accessing Registers During Deferred Execution," by inventors Shailender Chaudhry, Syed I. Haq, Mohammed M. Rahman, and Khanh Luu.

In addition, although we provide the above-described references as examples of a system that supports scout mode, numerous other publications, conference papers, patent publications, and issued patents describe additional aspects of the scout mode. See, for example, U.S. patent publication no. 2004/0133769, entitled "Generating Prefetches by Speculatively Executing Code through Hardware Scout Threading," by inventors Shailender Chaudhry and Marc Tremblay, or U.S. patent publication no. 2004/0133767, entitled "Performing Hardware Scout Threading in a System that Supports Simultaneous Multithreading," by inventors Shailender Chaudhry and Marc Tremblay.

Speculative Execution

FIG. 3 presents a state diagram which includes a normal-execution mode 300, an execute-ahead mode 302, a deferred-execution mode 304, and a scout mode 306 in accordance with the described embodiments. Generally, the described embodiments can operate in execute-ahead mode 302 or deferred-execution mode 304 to speculatively execute program code following a data-dependent stall condition in normal-execution mode 300. In addition, the described embodiments can operate in scout mode 306 to speculatively execute program code following a non-data-dependent stall condition in normal-execution mode 300, execute-ahead mode 302, or deferred-execution mode 304. Using speculative execution, these embodiments can perform useful computational work in cases where some existing processors are stalled waiting for a stall condition to be resolved so that subsequent instructions can be executed.

As shown in FIG. 3, processor 102 initially executes program code in normal-execution mode 300. In normal-execution mode 300, processor 102 executes instructions from program code in program order and commits results from executing instructions to the architectural state of processor 102.

Upon encountering an unresolved data dependency during execution of an instruction in normal-execution mode 300, processor 102 transitions to execute-ahead mode 302. In the described embodiments, an unresolved data dependency can include, but is not limited to: (1) a use of an operand that has not returned from a preceding load miss (e.g., a D-cache miss); (2) a use of an operand that has not returned from a preceding data translation lookaside buffer (DTLB) miss; (3) a use of an operand that has not returned from a preceding full or partial read-after-write (RAW) from store buffer operation; and (4) a use of a result from a prior instruction (as an operand) that was subject to an unresolved data dependency.

When transitioning to execute-ahead mode 302, processor 102 generates a checkpoint that can be used to restore a pre-speculation architectural state to processor 102. Generating the checkpoint involves preserving the architectural state of processor 102 to facilitate subsequent recovery should a need arise to return to the pre-speculation state during execute-ahead mode 302, deferred-execution mode 304, or scout mode 306.

In addition, because the instruction with the unresolved data dependency cannot be executed until the data dependency is resolved, execution unit 204 forwards the instruction to deferred buffer 208. The instruction is then stored in deferred buffer 208 until the data dependency is resolved. (We call this operation "deferring" the instruction, and refer to such an instruction as a "deferred instruction.") If the instruction writes an output to a destination register, processor 102 can also set a "not there" attribute bit in the register to indicate that the register is dependent on a deferred instruction.

By deferring the instruction with the unresolved data dependency, processor 102 frees execution unit 204 to speculatively execute subsequent non-dependent instructions. Hence, in execute-ahead mode 302, processor 102 continues to execute subsequent instructions in program order. While executing subsequent instructions, any instructions that cannot be executed because of an unresolved data dependency or a dependency on a result of a prior deferred instruction are not executed, but are instead also deferred and placed in deferred buffer 208 and a not there bit is set in the destination register for the instruction (if the instruction writes an output to a destination register). Note that processor 102 can detect the dependency on the prior deferred instruction using the not there attribute bit in the processor register.

As described below, the described embodiments can selectively continue executing load instructions following the deferral of a store instruction with an unknown destination address. In other words, these embodiments can determine whether to defer the load instruction or to allow the load instruction to continue execution despite the fact that a deferred store with an unknown destination address has been deferred.

While operating in execute-ahead mode 302, processor 102 monitors for data returns (e.g., a cache line or a DTLB translation returned to processor 102 from computer system 100 in response to a request, etc.). Upon detecting a data return, processor 102 transitions to deferred-execution mode 304.

In deferred-execution mode 304, processor 102 attempts to execute deferred instructions from deferred buffer 208 in program order. Processor 102 attempts to execute these instructions in program order with respect to other deferred instructions in deferred buffer 208 (i.e., deferred buffer 208 is a first-in-first-out buffer), but not with respect to other previously executed non-deferred instructions (and not with respect to deferred instructions executed in previous passes through deferred buffer 208). More specifically, during a deferred-execution mode episode, processor 102 issues each instruction from deferred buffer 208 to execution unit 204 in the order in which they were stored in deferred buffer 208. Note that, while issuing instructions from deferred buffer 208, processor 102 prevents the front end of pipeline 112 (i.e., instruction fetch unit 200 and instruction decode unit 202) from forwarding instructions to instruction execution unit 204, so that the only instructions executed by execution unit 204 during the deferred-execution mode 304 are issued from deferred buffer 208.

While attempting to execute each instruction from deferred buffer 208 in deferred-execution mode 304, upon encountering an instruction for which the data dependency has not yet been resolved, processor 102 re-defers execution and places the re-deferred instruction back into deferred buffer 208. (Note that processor 102 executes the other instructions that can be executed in program order with respect to each other.)

After the system completes a pass through deferred buffer 208, if deferred buffer 208 is empty, the system transitions to normal-execution mode 300. This may involve committing changes made during execute-ahead mode 302 and deferred-execution mode 304 to the architectural state of the processor, if such changes have not been already committed. Returning to normal-execution mode 300 can also involve deleting the checkpoint generated when the system moved into execute-ahead mode 302.

On the other hand, if deferred buffer 208 is not empty after the system completes a pass through deferred buffer 208, the system returns to execute-ahead mode 302 to execute instructions from the point where the execute-ahead mode 302 left off (i.e., processor 102 resumes fetching and executing instructions from the last instruction executed in execute-ahead mode 302 before the deferred-execution mode episode was started). Note that in some embodiments processor 102 does not resume execute-ahead mode 302, but instead stalls until another data return occurs (and then starts another deferred-execution mode episode).

Some embodiments also support a scout mode 306. If a non-data-dependent stall condition arises during normal-execution mode 300, execute-ahead mode 302, or deferred-execution mode 304, these embodiments can transition to scout mode 306 to speculatively execute instructions. In these embodiments, upon resolving the non-data-dependent stall condition, processor 102 restores the checkpointed architectural state and resumes operation in normal-execution mode 300. Note that restoring the checkpointed architectural state and resuming operation in normal-execution mode 300 involves overwriting or ignoring the speculative results generated during execute-ahead mode 302 and deferred-execution mode 304.

In some embodiments, although not shown in FIG. 3, upon encountering certain operating conditions and/or instructions while speculatively executing program code, processor 102 can immediately restore the most-recently generated checkpoint and resume operation in normal-execution mode 300. For example, in some embodiments, upon determining that a hardware resource is unavailable (busy, overflowed, etc.) while speculatively executing instructions, processor 102 can immediately restore the checkpoint. In some embodiments, this can happen when the store buffer overflows or when the deferred queue overflows.

Load/Store Execution Unit and Store Queue

Figure 4:
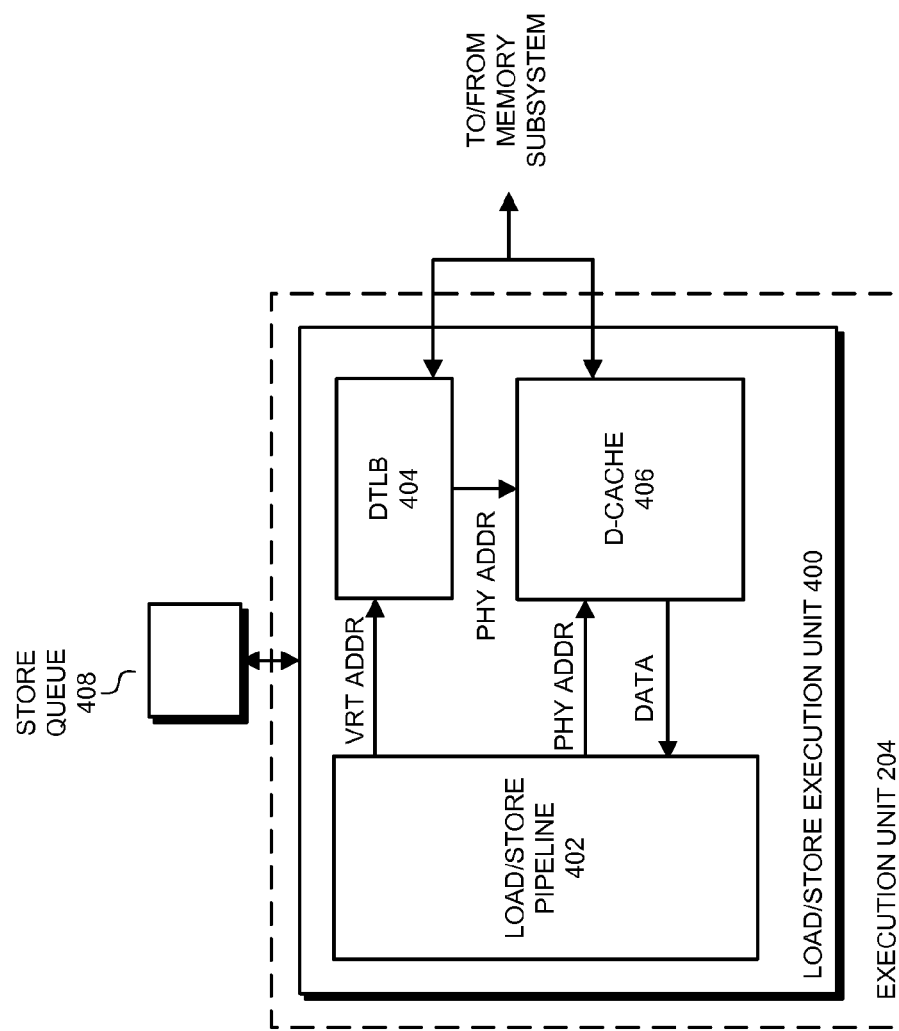
FIG. 4 presents a block diagram illustrating an exemplary execution unit in accordance with the described embodiments.

FIG. 4 presents a block diagram illustrating an execution unit 204 in accordance with the described embodiments. Execution unit 204 includes load/store execution unit 400. Load/store execution unit 400, which is coupled to store queue 408, includes load/store pipeline 402, data translation lookaside buffer (DTLB) 404, and data cache (D-cache) 406.

Note that the embodiment of load/store execution unit 400 shown in FIG. 4 is simplified for the purposes of illustration. Alternative embodiments include additional mechanisms (i.e., functional blocks, circuits, or hardware) for loading/storing data and/or handling memory operations. These mechanisms are known in the art and hence are not described in detail. In addition, as described above, in alternative embodiments execution unit 204 includes more and/or different execution units (e.g., floating point execution units, integer execution units, branch execution units, etc.).

Load/store execution unit 400 is used for executing memory loads and stores in pipeline 112. During operation, instructions that load data from memory 108 (collectively "load instructions") or store data to memory 108 (collectively "store instructions") are forwarded from decode unit 202 to load/store execution unit 400 to be executed to load values from/store values to data cache 406 (or from higher levels in the memory hierarchy) to/from processor registers. As an example, when load/store execution unit 400 executes a store instruction, the data is retrieved from a corresponding processor register (not shown) and stored to a cache line in D-cache 406 indicated by the store instruction.

Load/store pipeline 402 is an instruction execution pipeline that is used for executing loads and stores in load/store execution unit 400. Generally, load/store pipeline 402 includes a number of stages (not shown) coupled in series. Each of these stages is used to perform part of executing the load or store instructions. For example, one stage in load/store pipeline 402 can be used for accessing DTLB 404 for translating a virtual address to a physical address, and another stage of load/store pipeline 402 can be used for accessing a cache line in D-cache 406 using the physical address. Load/store pipelines are known in the art and hence are not described in detail.

Although, from the perspective of load/store pipeline 402, when a store instruction has completed execution, the corresponding store operation appears to be finished, processor 102 may actually have buffered the store operation in store queue 408. Processor 102 can then complete the store operation (i.e., forward the stored data to the memory subsystem for commitment) at a later time. In this way, processor 102 can use store queue 408 to hide the latency of the memory subsystem from load/store pipeline 402 and thus prevent unnecessary delays in the execution of subsequent instructions.

Because subsequent load instructions can be dependent on the data from stores that are buffered in store queue 408, load/store execution unit 400 includes mechanisms for forwarding data from buffered stores to subsequent dependent loads. In the described embodiments, these mechanisms can detect when a store operation matches a load operation (i.e., is directed to the same address in memory 108) and send the corresponding data to load/store pipeline 402 for placement in a register in processor 102. For example, if a store instruction directed to memory address "A" is buffered in store queue 408, and a subsequent load instruction is executed that loads the value from memory address A, load/store execution unit 400 can detect the store operation directed to memory address A in store queue 408, and forward the data to the dependent load.

In some embodiments, load/store execution unit 400 checks store queue 408 for load data before sending a request to the memory subsystem to satisfy the load instruction. If the load instruction can be satisfied using a buffered store operation, load/store execution unit 400 may not send the request to the memory subsystem. In some of these embodiments, the store is to completely satisfy the load instruction in order to be used. Thus, if a buffered store operation is a single byte, while the load requires a double-word (that includes the single byte), processor 102 may use a cache line in L1 cache 104 to satisfy the load.

DTLB 404 is a lookup structure used by load/store execution unit 400 for translating virtual addresses of cache lines of data (e.g., "VRT ADDR" in FIG. 4) into the physical addresses where the cache lines are actually located in memory (e.g., "PHY ADDR" in FIG. 4). DTLB 404 has a number of slots that contain page table entries that map virtual addresses to physical addresses. In some embodiments DTLB 404 is a content-addressable memory (CAM), in which the search key is the virtual address and the search result is a physical address. Generally, if a requested virtual address is present in DTLB 404 (a "DTLB hit"), DTLB 404 provides the corresponding physical address, which is then used to attempt to fetch the cache line from D-cache 406. Otherwise, if the virtual address is not present in DTLB 404 (a "DTLB miss"), in some embodiments, processor 102/DTLB 404 requests the page entry from one or more higher levels of DTLB (not shown). If the translation is not present in the DTLB (and, if used, any higher-level DTLB), the translation can be performed using a high-latency "page walk," which involves computing the physical address using one or more values retrieved from the memory subsystem. (Note that virtual addresses and physical addresses and their respective uses are known in the art and hence are not described in detail.)

D-cache 406 is a cache memory that stores a number of cache lines containing data. Generally, a request for a given cache line address can be sent to D-cache 406 to perform a lookup for the cache line. If the cache line is present in D-cache 406 (a "hit"), the cache line can be accessed in D-cache 406 (e.g., loaded from or stored to) in accordance with a coherency protocol in force in the memory subsystem. Otherwise, if the cache line is not present in D-cache 406 (a "miss"), the request can be forwarded to the next level in the memory subsystem so that the cache line can be placed in D-cache 406 and subsequently accessed.

Handling Load Instructions Following a Store with an Unknown Address

In the described embodiments, processor 102 includes one or more mechanisms for handling load instructions following the deferral of a store instruction that was directed to an unknown address during speculative execution (i.e., during execute-ahead mode 302 or deferred-execution mode 304). Specifically, these embodiments include mechanisms for determining if a load instruction is to continue executing, or if the load instruction is to be deferred following the store with the unknown destination address.

Generally, a store with an unknown destination address can occur when a store instruction uses as a source register a register that was previously marked "not there" because the instruction that wrote the value to the register encountered an unresolved data dependency and was deferred. For example, a load instruction can miss in the L1 cache, causing processor 102 to forward a request for the cache line to the L2 cache, defer the load instruction, and mark the destination register for the load instruction as not there by setting a corresponding attribute bit for the destination register. When a store instruction subsequently attempts to use the value in the not there register as an input for computing its destination address, processor 102 detects that the register has been marked not there, defers the store instruction, and updates an entry in store queue 408 that indicates that a store instruction with an unknown destination address has been deferred.

When a store to an unknown address is deferred, there is a possibility that subsequent loads will unknowingly read data from the address to which the deferred store is actually directed. However, because the store was deferred, and therefore not completed, these subsequent load instructions can read incorrect data (thereby causing a read-after-write (RAW) error). Thus, existing processors either immediately fail speculative execution or simply defer all load instructions encountered following a store with an unknown address.

Unlike existing processors, in the described embodiments, processor 102 selectively defers load instructions following the deferral of a store to an unknown address and continues executing the remaining load instructions. By selectively deferring the loads, the described embodiments can avoid some of the deferred queue overflows that can occur in existing processors that automatically defer all load instructions. In addition, by selectively deferring load instructions, these embodiments can avoid continuing executing load instruction(s) that are more likely to be directed to the same address as a deferred store, thereby avoiding the need to restore a previously-generated checkpoint and redo any computational work between where the checkpoint was generated and where the RAW error was detected.

In the described embodiments, the mechanisms for handling load instructions include a mechanism for determining if the load instruction is likely or guaranteed not to require the data from a deferred store with an unknown address. Some exemplary mechanisms are described in the following section. However, these mechanisms generally monitor each load instruction encountered by the processor as the load instruction is prepared for execution and/or executed to determine if the load instruction is a candidate for deferral (i.e., if the load instruction is presumed to be dependent on a deferred store). If not, these embodiments continue executing the load instruction. In some embodiments, processor 102 starts monitoring load instructions upon encountering the store to the unknown address (e.g., upon adding the entry to store queue 408).

In these embodiments, processor 102 also keeps track of the load instructions that were allowed to continue execution. Then, as each store address is eventually computed/resolved in deferred-execution mode 304, if a load instruction is found to have been directed to the same address, processor 102 can detect the RAW error. Some embodiments handle a RAW error by immediately terminating speculative execution, restoring a checkpoint, and resuming operation in normal-execution mode 300. In alternative embodiments, instead of immediately returning to normal-execution mode 300 upon terminating speculative execution, processor 102 transitions to scout mode 306 to execute subsequent instructions. In these embodiments, when the data dependent stall condition that caused processor 102 to commence speculative execution has been resolved, processor 102 can restore the checkpoint and resume operation in normal-execution mode 300. Note that, in either of these embodiments, processor 102 eventually restores the checkpoint and resumes operation in normal-execution mode 300.

In these embodiments, processor 102 can include a tracking mechanism (not shown) for keeping a record of load instructions that have been allowed to continue executing (i.e., that have not been deferred) following the deferral of a store instruction with an unknown address. For example, in some embodiments, the mechanism can keep a list of load instructions and the memory address from which each load instruction retrieved data. Then, as an address is resolved for each store during deferred-execution mode, processor 102 can compare the store address to each address in the list of load instructions to determine if the addresses are the same.

In some embodiments, when processor 102 attempts to execute deferred loads that are dependent on a store with an unknown destination address in deferred-execution mode 304 (i.e., after having already attempted to execute them at least once before deferring them during execute-ahead mode 302), processor 102 may discover that conditions have changed, and may continue executing the load instruction, despite the fact that the store instruction upon which the load instruction is dependent was re-deferred.

Determining if a Load Instruction is to be Deferred

As mentioned above, the described embodiments determine if each load instruction is to be deferred (or continue executing) following the deferral of a store instruction with an unknown destination address during speculative execution. In this section we describe some embodiments that determine if a load operation is to continue executing following the deferral of a store instruction with an unknown destination address.

Although we disclose the following embodiments that determine which loads processor 102 continues executing after a store to an unknown destination address has been deferred, alternative embodiments can use different techniques and/or operations. Generally, assuming that processor 102 has deferred a store instruction (instructions) that is (are) directed to an unknown address, the described embodiments can use any mechanism, circuit, and/or hardware structure in processor 102 that monitors load instructions during speculative execution and determines if/when a given load instruction is less likely or guaranteed not to encounter a RAW error based on a deferred store instruction. Upon determining that a load instruction is likely or guaranteed not to encounter a RAW error, instead of deferring the load instruction, the described embodiments can continue executing the load instruction.

In some embodiments, some or all of the mechanisms and/or structures can be implemented in software or a combination of hardware and software. For example, the mechanisms may include control switches, program code, configuration variables, and/or other software interfaces or functions that configure, enable, or perform some or all of the above-described monitoring and determination operations.

Note that the embodiments described in this section are not mutually exclusive. Hence, the described embodiments may be configured to use one or more of the techniques and operations in determining whether a load instruction is to continue executing.

Determination Based on Predicted Store Address

In some embodiments, processor 102 can project, predict, and/or assume (collectively "predict") an address for a store that is directed to an unknown address. In these embodiments, the determination of whether a load instruction is to continue executing can be based on a probability of the load instruction loading data from the same address as the buffered store.

Some embodiments can predict that the store instruction is directed to a particular address in memory. The address of subsequent load instructions can then be directly compared with the predicted address to determine if the load instructions are to continue executing. In these embodiments, if the address matches, the load instruction is deferred.

Some embodiments can predict that the store is directed to a "region" of memory (i.e., a set, section, or block of addresses in memory). In these embodiments, the region of memory can include a predetermined number of memory addresses. For example, the memory can be logically divided into N regions, each of which includes M addresses, or any section or sections of memory can be designated a region. In these embodiments, the regions of memory need not be of uniform size, or include only contiguous memory locations (i.e., the set of memory addresses can be distributed among separate locations in memory. When a deferred store instruction is predicted to be directed to a given region of memory, the address of each load instruction can be compared to see if the address falls within the region of memory. If the address of the load instruction falls into the predicted region of memory, the load instruction is deferred.

In some embodiments, the memory can be divided into regions according to the nature of the program code being executed, the type of processor, the operating system, or using another characteristic of computer system 100 or processor 102. For example, if the program code and/or operating system designates portion of the memory as general-purpose memory and the remainder of the memory as special-purpose memory (e.g., heap memory, stack memory, etc.), processor 102 can predict that a given store is directed to a region that includes the general-purpose memory or the special-purpose memory.

In some embodiments, the memory can be divided into regions according to a designation set using a hardware switch (e.g., register value(s), etc.) or software variable. In these embodiments, an application, a daemon or configuration program, an operating system, a programmer, and/or a system administrator can configure the system to include specific areas of memory into regions of memory (i.e., "hot" areas of memory, etc.). In addition, in some embodiments, an application, a daemon/configuration program, an operating system, a programmer, and/or a system administrator can configure how processor 102 predicts the memory region to which the store is directed (e.g., can configure processor 102 to predict that stores are directed to a given "hot" region of program code).

Some embodiments can predict that a buffered store is within a predetermined number of memory addresses from a prior store or other prior instruction (or from a predetermined number of prior stores/instructions) in program code. In these embodiments, the "region" of memory is therefore defined by recently executed program code. These embodiments can take advantage of the fact that instructions in a given section of program code are often directed to similar areas of memory.

In some embodiments, one or more factors can be used in predicting the address to which a store is directed. For example, the addresses used in one or more prior instructions (e.g., load instructions, store instructions, and/or other instructions) can be used in making the prediction. In some of these embodiments, the prediction of the address to which the store is directed can be based on a prior execution of the store instruction. In these embodiments, processor 102 can include a store-address memory structure (not shown) that contains a number of entries, each of which includes a store identifier (e.g., the program counter of the store, the address in memory from which the store instruction was retrieved, a value indicating the location of the store in program code, etc.) and a destination address for the store.

Determination Based on the Location of a Buffered Store in a Banked Store Queue

In some embodiments, store queue 408 includes hardware structures that can be used for determining whether to continue executing a load instruction following the deferral of a store instruction with an unknown destination address. In these embodiments, one or more circuits, mechanisms, or hardware structures in processor 102 can be configured to enable the determination whether to defer load instructions following the deferral of the store instruction.

For example, in some embodiments, a memory in store queue 408 used for holding buffered stores is divided into a number of blocks called "banks" that each include a separate portion of the memory. Each bank is a separate first-in-first-out memory designated for holding stores to a corresponding subset of the address space in processor 102, and a controller in store queue 408 controls the ordering of completion for store operations from the among the set of banks.

In these embodiments, the bank to which the store is to be buffered is determined using a hash function for which the input is the destination address of the store. Specifically, the bank can be identified using the hash function, and then the store can be placed in a least-recently-used (or unused) entry in the identified bank. When subsequently determining whether a load instruction can be satisfied from store queue 408 (i.e., whether data can be forwarded from a buffered store), the bank in which the store is located is computed using the hash function with the address of the load instruction as input. Processor 102 can then search for the buffered store only in the bank in which the matching store would be located (if such a store was present in store queue 408).

Figure 5A:
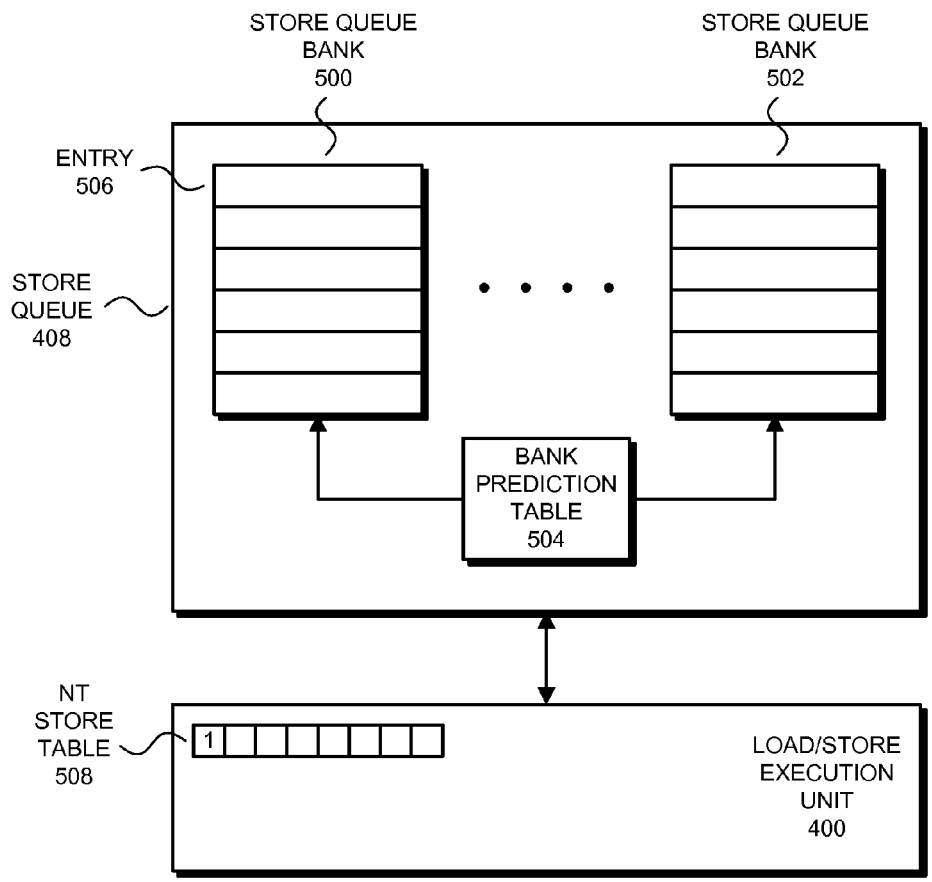
FIG. 5A presents a block diagram illustrating a store queue with store queue banks in accordance with the described embodiments.
Figure 5B:
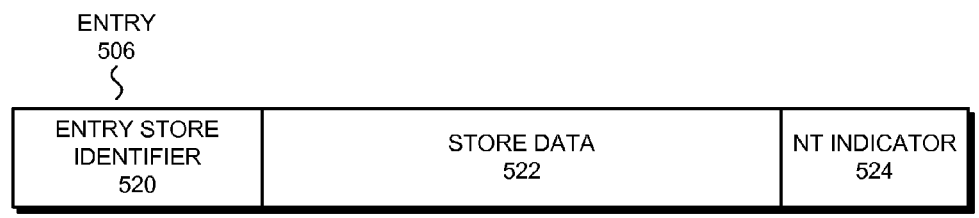
FIG. 5B presents a block diagram illustrating an entry in a store queue bank in accordance with the described embodiments.

FIG. 5A presents a block diagram illustrating a store queue 408 with store queue banks 500 and 502 that are used for buffering stores in accordance with the described embodiments. Each store queue bank 500-502 includes a number of entries 506 that are used to hold buffered stores. FIG. 5B presents a block diagram illustrating an entry in a store queue bank in accordance with the described embodiments. As can be seen in FIG. 5B, each entry includes an entry store identifier 520, store data 522, and an NT indicator 524. Entry store identifier 520 holds a value used to identify the store. In some embodiments, the value is the address of the store, or a value derived from the address of the store that can be used to identify the store. Store date 522 holds the data for the store (e.g., the data that is to be stored in an address in memory). NT indicator 524 holds a "not there" indicator that indicates that the store was dependent on a not there register as an input for computing the destination address of the store (i.e., that the store data is for a store that is directed to an unknown address).

In the described embodiments, along with stores to known addresses, stores that are directed to unknown addresses are buffered in store queue 408. In other words, an entry is added to store queue 408 to indicate that a store that is directed to an unknown destination address has been deferred in processor. However, as described above, store queue 408 computes the bank in which the buffered store is located using a hash function for which the input is the destination address for the store—an operation that cannot complete for stores that are directed to unknown addresses. Thus, in order to determine a bank in which to place the store, store queue 408 can use: (1) random bank assignment; (2) bank assignment based on some or all of the last N stores buffered; (3) patterned bank assignment (e.g., round-robin, hot-bank/asymmetrical bank assignment, etc.); (4) a programmer-, application-, operating system-, or processor 102-designated bank selection; or (5) bank prediction. In these embodiments, when the bank has been determined, store queue 408 places the store in the identified bank.

In the embodiments that support bank prediction, store queue 408 can include a bank prediction table 504. Generally, store queue 408 uses bank prediction table 504 to keep a record of buffered stores and the store queue bank in which the buffered store was placed. Bank prediction table 504 is a memory structure with a set of entries that each includes a store identifier and a bank ID. For example, FIG. 5C presents a block diagram illustrating a bank prediction table 504 in accordance with the described embodiments. As can be seen in FIG. 5C, bank prediction table 504 includes store identifier 530 and bank ID 532.

As a store is buffered in store queue 408, a least-recently used (or unused) entry in bank prediction table 504 is updated to include an identifier for the store and a bank resolution. In these embodiments, the store identifier can be any value that identifies a buffered store, including, but not limited to, a program counter for the store instruction or an address in memory from which the store instruction was retrieved. Bank ID 532 holds a value that indicates the bank in which the buffered store was placed.

In these embodiments, when determining a bank for buffering a store that is directed to an unknown destination address, store queue 408 can first read bank prediction table 504 to see if bank prediction table 504 includes an entry for the store. For example, given a store from a program counter X, store queue 408 can determine if bank prediction table 504 includes an entry for the same program counter. If such an entry is found in bank prediction table 504, store queue 408 can place the store in the store queue bank indicated in the entry. Otherwise, store queue 408 can place the store in one of the banks using one of the other techniques described above.

When subsequently executing load instructions, processor 102 determines if the load instructions can be satisfied from a buffered store in store queue 408. Additionally, processor 102 can determine if a record of a store to an unknown destination address is held in the store queue bank from which the load would be satisfied. Specifically, as part of the lookup, store queue 408 can use the hash function to compute the bank from which the load would be satisfied. Store queue 408 can then determine if the bank holds a record of a store to an unknown destination address. If so, in some embodiments, the load instruction can be deferred.

Although we describe particular entry formats for bank prediction table 504, in some embodiments fewer, more, or different fields may be present in bank prediction table 504. Generally, these entries can include any value that enables the identification of a bank in which a store was buffered.

In some embodiments, load/store execution unit 400 includes an indicator of banks that hold a record of a deferred store. For example, as shown in FIG. 5A, NT store table 508 can hold a record of the deferred stores. In these embodiments, load/store execution unit 400 may not communicate with store queue 408 when determining if a load instruction matches a bank with a record of a store directed to an unknown destination address. Instead, NT store table 508 can be consulted. In these embodiments, load/store execution unit 400 can also compute the bank from where data for the load instruction might be located and can defer the load upon finding the store directed to the unknown destination address in the same bank.

Determination Based on Features of Load Instruction

In some embodiments, processor 102 can use the features of the load instruction and/or the buffered store(s) to determine whether to continue executing the load following the deferral of a store instruction with an unknown destination address. In these embodiments, processor 102 can use any feature of the load instruction and/or the buffered store, such as the type of load instruction and/or buffered store operation (e.g., byte, double-word, etc.), the program counter of the load instruction and/or store instruction, an immediate value in the load instruction and/or store instruction, an opcode, or other features of the load instruction and/or store instruction. Generally, the features of the load/store instruction include any information that can be extracted from the load/store instruction itself and/or that can be determined from information extracted from the load/store instruction. In these embodiments, if the features of a buffered store to an unknown destination address differ from the features of a load, processor 102 can continue executing the load instruction.

For example, in some of these embodiments, a load is satisfied completely from a single location. That is, the load can either be satisfied from a store queue 408 entry or from a cache line, but cannot be partially satisfied from a cache line and partially from a store buffer entry. In other words, assuming that the load loads a doubleword, and the store buffer includes a store to a byte, the load cannot be completely satisfied from the buffered store, and hence processor 102 loads all the data from the cache. In these embodiments, when a load instruction loads differently-sized data than a buffered store operation with an unknown address, processor 102 can determine that the store operation cannot be used to satisfy the load operation, and can continue executing the load operation.

Determination Based on Read-after-Write Prediction for Load

In some embodiments, processor 102 uses a RAW prediction to determine whether to continue executing the load following the deferral of a store instruction with an unknown destination address. In these embodiments, processor 102 can keep track of load instructions that have previously encountered a RAW error. When such a load instruction is again encountered following the deferral of a store that is directed to an unknown destination address, processor 102 can determine that the load instruction should be deferred. Note that this is a prediction; the load instruction may not have actually encountered a RAW error if the load instruction continued executing.

FIG. 6 presents a block diagram illustrating a load RAW prediction table 600 in accordance with the described embodiments. As can be seen in FIG. 6, load RAW prediction table 600 includes a number of entries 602. Each entry 602 includes a load identifier 604 and a RAW bit 606. Generally, load RAW prediction table 600 can be a separate hardware structure/circuit (e.g., a content-addressed-memory (CAM)) that enables a characteristic of a load instruction to be rapidly compared with a set of records of prior load instruction(s) that have encountered RAW errors.

A load identifier 604 for a given entry 602 can include any value that identifies the load, including, but not limited to: a program counter, an address from which the load is retrieving data, a register to which the load is storing the data, and/or another value that identifies the load. For example, processor 102 can compute a relative or absolute value that: designates the position of the load in the program code (e.g., within a given function call, etc.), indicates the memory/register that the load uses, indicates a particular operating condition that coincides with the execution of the load that caused a prior RAW hazard, or indicates the type of load (i.e., load-immediate, load-double-word, etc.).

In some embodiments, a given load instruction may not be particularly identified. Instead a function or another region of the program code may have all of its loads flagged as candidates for RAW errors. In the described embodiments, therefore, the load identifier 604 can be formatted so that processor 102 can determine the type of identifier the load identifier 604 (e.g., base-plus-offset, absolute value, counter value, etc.).

RAW bit 606 can be any value that indicates that the entry 602 in load RAW prediction table 600 is valid and/or should be used by processor 102 in determining if a load instruction should be deferred or continue execution. For example, in some embodiments, RAW bit 606 is a single bit that, when set to 1, indicates that the entry is valid (and the corresponding load has previously encountered a RAW error), and, when set to 0, indicates that the entry is invalid or should otherwise not be compared.

Although we describe particular entry formats for load RAW prediction table 600, in some embodiments fewer, more, or different fields may be present in load RAW prediction table 600. Generally, these entries can include any value that enables the identification of a load as being likely (or not likely) to cause a RAW hazard.

Note also that in comparing the load with entries in load RAW prediction table 600, these embodiments may not compare the load instruction with any buffered store operation in store queue 408. In other words, these embodiments may use the RAW prediction alone in determining if the load operation is to continue executing.

Determination Based on a Temporal Locality of a Store in the Store Queue

In some embodiments, processor 102 uses the "temporal locality" of the record of the buffered store that is directed to the unknown destination address in store queue 408 to determine whether to continue executing the load. Generally, the store queue is a first-in-first-out buffer, with each store being placed in the store queue in a next available entry 506. When forwarding data from buffered stores to subsequent load instructions, data is typically forwarded more often from the last few (newest) entries 506 added to store queue 408. Most often, data is forwarded from the most recent (newest) entry 506 added to store queue 408. Thus, as entries get older, and therefore further into store queue 408, they are less likely to be used for forwarding data. In using the temporal locality of buffered stores, processor 102 monitors a store buffer entry 506 for each store with an unknown destination address. As the entry gets older, i.e., as one or more newer entries are added to store queue 408 after the monitored store, processor 102 recognizes the age of the entry for the store that is directed to the unknown destination address and adjusts the number of load operations that continue executing.

For example, if the entry 506 for the store with the unknown destination address is the last/most recent entry in store queue 408, processor 102 may not continue executing any load instructions, but instead may defer all load instructions. Processor 102 can keep deferring load instructions in this way until the entry 506 for the store in store queue 408 has been followed by one, two, or more additional entries, and then can begin allowing a portion of load instructions to continue executing. In some embodiments, when enough buffered stores have been written to store queue 408 behind the entry 506 for the store, processor 102 can continue executing all load instructions (because there is a much lower likelihood of forwarding data from the store when the store reaches a certain depth in the store queue).

In some embodiments, as long as the last/newest store is "there" (i.e., is not a store with an unknown destination address), processor 102 can continue executing all load instructions. In these embodiments, the number of "not there" stores in store queue 408 before the latest store is immaterial.

In some embodiments, processor 102 can determine that data is not likely to be forwarded from a buffered store after a certain number of processor clock cycles/pipeline stages, etc., e.g., 20 clock cycles, even if the buffered store is the newest entry in store queue 408. In some embodiments, the time is proportional to an expected time for an event such as a return of data from L2 cache 106. In these embodiments, processor 102 can continue executing a portion of the load instructions encountered (i.e., some or all of the load instructions) when an entry 506 in store queue 408 reaches a predetermined age.

Determination Based on Contents of Store Buffer

In some embodiments processor 102 can use other stores (if any are present) in store queue 408 to determine whether to continue executing the load following the deferral of a store instruction with an unknown destination address. In these embodiments, assuming records of one or more "not there" stores (i.e., stores directed to unknown destination addresses) are held in store queue 408, processor 102 can use the other "there" stores to determine whether to continue executing a load.

As described above, store queue 408 can hold a number of buffered stores. In the described embodiments, when searching store queue 408 to determine if store queue 408 holds data for satisfying a given load, processor 102 can potentially find two or more stores that are directed to the same address as a given load (an occurrence we call a "multi-hit"). However, the more common case is to find only one store that matches each load. Based on this observation, in these embodiments, if a "there" load is found in store queue 408 that can be used to satisfy a load instruction, even if a record of a "not there" store is also held in store queue 408, processor 102 can assume that the load is not retrieving data from the same address as the store to the unknown address, and can continue executing the load instruction. Otherwise, processor 102 can defer the load instruction.

In some of these embodiments, the number of not there stores in store queue 408 is irrelevant. More specifically, as long as at least one store in store queue 408 can be used to satisfy the load instruction, the load instruction is not deferred, but instead continues executing.

Process for Determining if a Load Instruction is to Continue Executing

Figure 7:
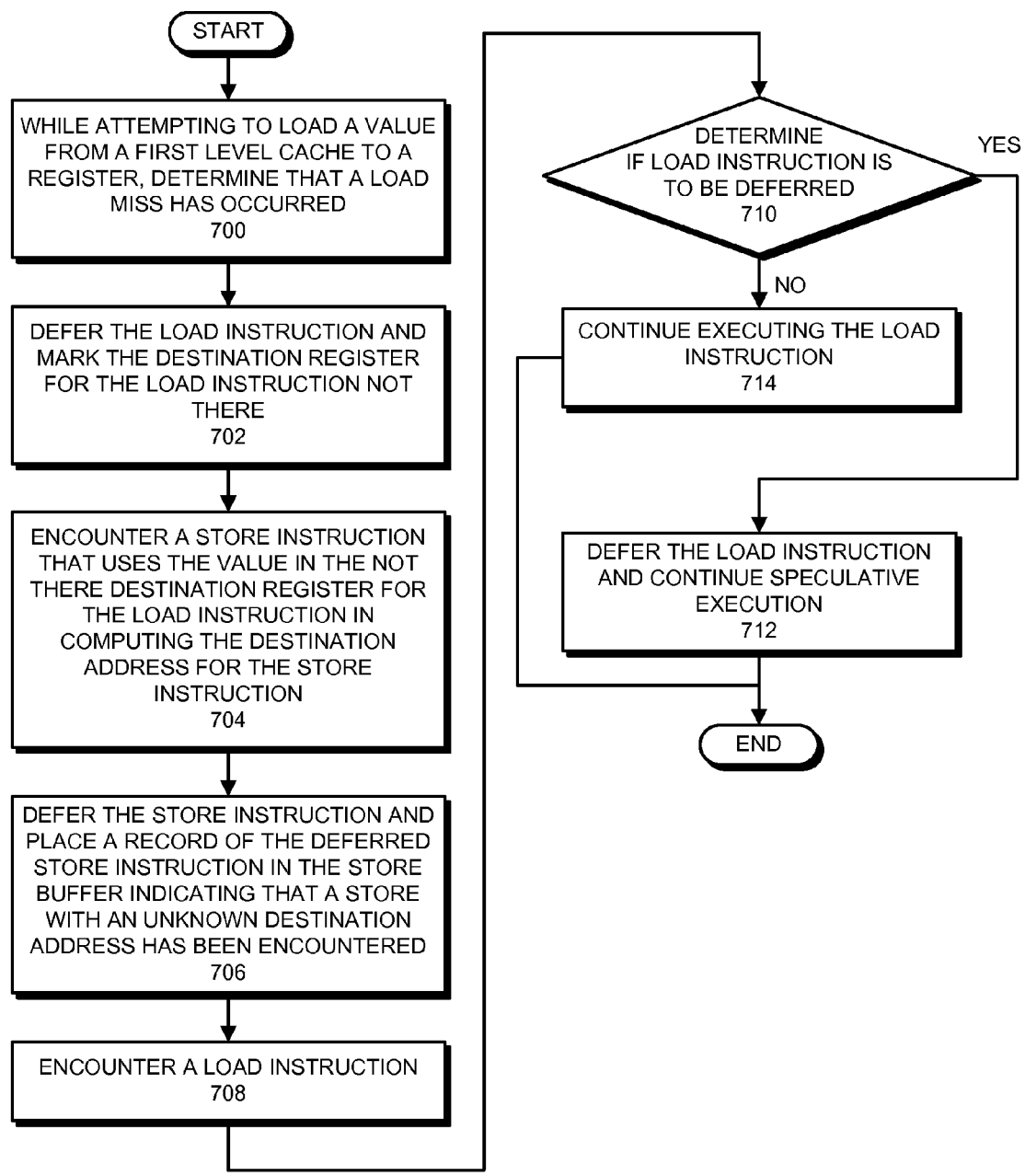
FIG. 7 presents a flowchart illustrating a process for determining if a load instruction is to continue executing in accordance with the described embodiments.

FIG. 7 presents a flowchart illustrating a process for determining if a load instruction is to continue executing in accordance with the described embodiments. The process shown in FIG. 7 starts when processor 102, while attempting to load a value from L1 cache 104 to a processor register, determines that a load miss has occurred (step 700). As described above, processor 102 then defers the load instruction and marks the destination register for the load instruction not there (step 702). Note that we describe a load instruction that misses in L1 cache 104 for illustrative purposes. However, any instruction (e.g., ADD, MOV, CAS instructions, etc.) that writes a value to a processor register can have an unresolved data dependency, be deferred, and have the not there bit set in the instruction's output/destination register.

Processor 102 then encounters a store instruction that uses the value in the not there register for the load instruction in computing the destination address for the store instruction (step 704). Next, processor 102 defers the store instruction and places a record of the deferred store instruction in the store buffer indicating that a store that is directed to an unknown destination address has been encountered (step 706). In some embodiments, this involves adding an entry in the store buffer that indicates that there is an outstanding "not there" store that was dependent on one or more not there source registers as inputs for computing a destination address.

Processor 102 subsequently encounters a load instruction (step 708) and determines that the load instruction is to be deferred (step 710). Generally, this operation involves determining if the load instruction can continue execution despite the fact that a store instruction with an unknown destination address has been deferred. As described above, there are a number of techniques that can be used by the described embodiments for determining if the load instruction can continue execution. For example, processor 102 can be configured to, but is not limited to, making the determination based on one or more of: a predicted store address; a location of a buffered store in a banked store queue; a read-after-write (RAW) prediction for load; the temporal locality of the deferred store in store queue 408; the contents of store buffer; the features of the load instruction.

If the load instruction is not to be deferred, processor 102 continues executing the load instruction (step 714). Otherwise, processor 102 defers the load instruction and continues speculative execution (step 712). By determining if the load instruction is to be deferred in this way, processor 102 can selectively defer load instructions following the deferral of a store instruction, thereby avoiding automatically deferring all load instructions (which often leads to deferred queue overflows) and/or not deferring load instructions that are probable to cause a RAW error (which can lead to processor 102 restoring a checkpoint and being obligated to re-perform computational operations). By not deferring the load instructions, processor 102 can avoid "not there" registers, which means more computational work can be done during speculative execution, and less instructions need to be executed in deferred mode.

Figure 8:
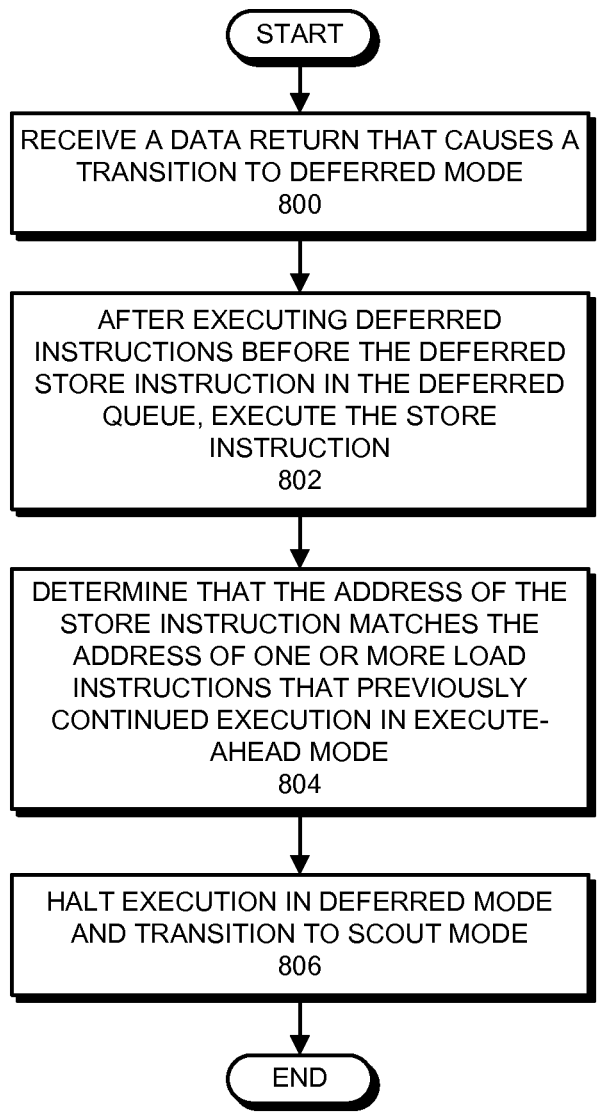
FIG. 8 presents a flowchart illustrating a process for handling an error in accordance with the described embodiments.

FIG. 8 presents a flowchart illustrating a process for handling an error that occurs upon resolving an address for a store in deferred-execution mode 304 and determining that a previously-executed load was directed to the same address in accordance with the described embodiments. The operations shown in FIG. 8 follow step 714 in FIG. 7. Specifically, before the process shown in FIG. 8, processor 102 determined that a load instruction was to continue executing despite a buffered store that was directed to an unknown address.

As described above, for the process shown in FIG. 8, we assume that the load instruction that continued execution in step 714 is directed to the same address in memory as the buffered store instruction described with respect to steps 704-706 in FIG. 7. In other words, the determination made in step 710 of FIG. 7 has turned out to be incorrect. As this shows, the determination of whether continue executing the load instruction can, in some cases, be incorrect. However, because processor 102 has a checkpoint generated upon commencing speculative execution, processor 102 can recover the pre-speculation architectural state, thereby avoiding irretrievably corrupting the architectural state of processor 102 after continuing to execute the load instruction (as described in step 714). Thus, the incorrect determination for the load instruction has an impact on "performance" (because the checkpoint is restored and computational work re-done), but not "correctness" (because a known-good architectural state can be recovered).

The process shown in FIG. 8 starts with processor 102 receiving a data return that enables processor 102 to begin operating in deferred-execution mode 304 (step 800). For the sake of illustration, we assume that the data return resolves the data dependency for the load instruction in steps 700-702 in FIG. 7. Because this data dependency is resolved, the load instruction can be executed in deferred-execution mode, and therefore the dependent (and deferred) store instruction described in steps 704-706 can be executed.

After executing the instructions before the store instruction from deferred queue 408 in deferred-execution mode 304 (including the load instruction upon which the store instruction is dependent), processor 102 executes the deferred store instruction (step 802). While executing the store instruction, processor 102 determines that the address of the store instruction matches the address from one or more load instructions that previously continued executing in execute-ahead mode (step 804).

As described above, in some embodiments, to make this determination, processor 102 can compare the address computed for the store with a list of addresses maintained by the processor for load instructions that were allowed to continue executing after the store instruction was deferred. If one of the addresses in the list matches the destination address of a deferred store instruction that is being executed during deferred-execution mode, processor 102 can halt execution in the deferred-execution mode 304 and transition to scout mode 306 (step 806). In alternative embodiments, instead of transitioning to scout mode, processor 102 can restore the checkpoint and directly resume operation in normal-execution mode 300.

Although we describe embodiments where processor 102 maintains a list of the addresses of load instructions, in alternative embodiments, other techniques can be used. For example, memory locations loaded from by such stores can have an attribute bit set to indicate that such a load loaded from the memory location.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing instructions in a processor, comprising:
while executing instructions in an execute-ahead mode, encountering a store instruction for which a destination address is unknown;
deferring the store instruction;
updating an entry in a store queue for the processor to include a record indicating that the store instruction has been deferred, wherein the store queue comprises a memory for buffering stores which is divided into two or more banks and which is separate from cache for the processor, and wherein updating the entry in the store queue comprises determining a bank in which the entry for the store queue is located and updating the entry in the determined bank;
upon encountering a load instruction while the store instruction with the unknown destination address is deferred, determining if the load instruction is to continue executing or is to be deferred by:
determining if the load instruction would retrieve data from the bank in which the entry for the store queue is located;
when the load instruction would retrieve data from the bank, deferring the load instruction; and
when the load instruction would not retrieve data from the bank, continuing executing the load instruction.

2. The method of claim 1, wherein determining if the load instruction is to continue executing involves:
predicting the destination address for the store instruction or predicting a set of addresses in which the destination address may be included;
comparing an address of the load instruction with the predicted destination address or set of addresses to determine if the address for the load instruction matches the destination address or one of the addresses in the set of addresses;
when the address for the load instruction matches the destination address or one of the addresses in the set of addresses, deferring the load instruction; and
when the address for the load instruction does not match the destination address or any one of the addresses in the set of addresses, continuing executing the load instruction.

3. The method of claim 2, wherein the method further comprises maintaining a list of one or more previously-executed store instructions, wherein each entry in the list includes the destination address for a corresponding previously-executed store instruction, and wherein predicting the destination address for the store instruction involves:
checking the record for an entry for the store instruction; and
when an entry for the store instruction is found in the list, using the destination address in the entry as the predicted destination address.

4. The method of claim 1, wherein the entry in the store queue includes a record of one or more features of the store instruction, and wherein determining if the load instruction is to continue executing involves:
checking the entry in the store queue to determine if one or more features of the load instruction substantially match one or more features of the store to the unknown destination address;
when the one or more features of the load instruction substantially match the one or more features of the store to the unknown destination address, deferring the load instruction; and
when the one or more features of the load instruction do not substantially match the one or more features of the store to the unknown destination address, continuing executing the load instruction.

5. The method of claim 1, wherein determining if the load instruction is to continue executing involves:
determining if a predetermined number of entries have been updated in the store queue to indicate stores for which the destination address is known since the entry in the store queue was updated to indicate that the store instruction with the unknown destination address had been deferred;
when less than the predetermined number of entries has been updated, deferring the load instruction; and
when more than the predetermined number of entries has been updated, continuing executing the load instruction.

6. The method of claim 1, wherein determining if the load instruction can continue executing involves:

determining if at least one entry in the store queue can be used to provide data for the store instruction;

when no entry in the store queue can be used to provide the data, deferring the load instruction; and when at least one entry in the store queue can be used to provide the data, continuing executing the load instruction.

7. The method of claim 1, wherein the processor includes a record of previously-executed load instructions that have encountered a read-after-write hazard, and wherein determining if the load instruction is to continue executing involves:

checking the record to determine if the load instruction encountered a read-after-write hazard in a previous execution;

when the load instruction encountered a read-after-write hazard in a previous execution, deferring the load instruction; and when the load instruction did not encounter a read-after-write hazard in a previous execution, continuing executing the load instruction.

8. The method of claim 1, wherein the method further comprises:

after receiving a data return that enables the execution of the deferred store instruction, executing the deferred store instruction in a deferred-execution mode;

upon resolving the destination address for the store instruction, determining if the load instruction that continued executing loaded data from the destination address;

when the load instruction loaded data from the destination address, transitioning to a scout mode to execute subsequent instructions; and when the load instruction did not load data from the destination address, continuing executing in the deferred-execution mode.

9. An apparatus for speculatively executing instructions, comprising:

a processor; and a store queue coupled to the processor, wherein the store queue comprises a memory for buffering stores which is divided into two or more banks and which is separate from cache for the processor;

while executing instructions in an execute-ahead mode, upon encountering a store instruction for which a destination address is unknown, the processor is configured to:

defer the store instruction;

update an entry in the store queue to include a record indicating that the store instruction has been deferred, wherein, while updating the entry in the store queue, the processor is configured to determine a bank in which the entry for the store queue is located and updating the entry in the determined bank;

upon encountering a load instruction while the store instruction with the unknown destination address is deferred, determine if the load instruction is to continue executing or is to be deferred by:

determining if the load instruction would retrieve data from the bank in which the entry for the store queue is located;

when the load instruction would retrieve data from the bank, deferring the load instruction; and when the load instruction would not retrieve data from the bank, continuing executing the load instruction.

10. The apparatus of claim 9, wherein when determining if the load instruction is to continue executing, the processor is configured to:

predict the destination address for the store instruction or predict a set of addresses in which the destination address may be included;

compare an address of the load instruction with the predicted destination address or set of addresses to determine if the address for the load instruction matches the destination address or one of the addresses in the set of addresses;

when the address for the load instruction matches the destination address or one of the addresses in the set of addresses, defer the load instruction; and when the address for the load instruction does not match the destination address or any one of the addresses in the set of addresses, continue executing the load instruction.

11. The apparatus of claim 10, wherein the processor is configured to maintain a list of one or more previously-executed store instructions, wherein each entry in the list includes the destination address for a corresponding previously-executed store instruction, wherein when predicting the destination address for the store instruction, the processor is further configured to:

check the list for an entry for the store instruction; and when an entry for the store instruction is found in the record, use the destination address in the entry as the predicted destination address.

12. The apparatus of claim 9, wherein the entry in the store queue includes a record of one or more features of the store instruction, and wherein when determining if the load instruction is to continue executing, the processor is configured to:

check the entry in the store queue to determine if one or more features of the load instruction substantially match one or more features of the store to the unknown destination address;

when the one or more features of the load instruction substantially match the one or more features of the store to the unknown destination address, defer the load instruction; and when the one or more features of the load instruction do not substantially match the one or more features of the store to the unknown destination address, continue executing the load instruction.

13. The apparatus of claim 9, wherein when determining if the load instruction is to continue executing, the processor is configured to:

determine if a predetermined number of entries have been updated in the store queue to indicate stores for which the destination address is known since the entry in the store queue was updated to indicate that the store instruction with the unknown destination address had been deferred;

when less than the predetermined number of entries has been updated, defer the load instruction; and when more than the predetermined number of entries has been updated, continue executing the load instruction.

14. The apparatus of claim 9, wherein when determining if the load instruction can continue executing, the processor is configured to:

determine if at least one entry in the store queue can be used to provide data for the store instruction;

when no entry in the store queue can be used to provide the data, defer the load instruction; and when at least one entry in the store queue can be used to provide the data, continue executing the load instruction.

15. The apparatus of claim 9, wherein the apparatus further comprises:

a recording mechanism in the processor, wherein the recording mechanism is configured to keep a record of previously-executed load instructions that have encountered a read-after-write hazard;

wherein when determining if the load instruction is to continue executing the processor is configured to:

check the record to determine if the load instruction encountered a read-after-write hazard in a previous execution;

when the load instruction encountered a read-after-write hazard in a previous execution, defer the load instruction; and when the load instruction did not encounter a read-after-write hazard in a previous execution, continue executing the load instruction.

16. A computer system for speculatively executing instructions, comprising:

a memory;

a processor coupled to the memory, wherein the memory stores instructions and data for the processor; and a store queue coupled to the processor, wherein the store queue comprises a memory for buffering stores which is divided into two or more banks and which is separate from cache for the processor, wherein while executing instructions in an execute-ahead mode, upon encountering a store instruction for which a destination address is unknown, the processor is configured to:

defer the store instruction;

update an entry in the store queue to include a record indicating that the store instruction has been deferred, wherein, while updating the entry in the store queue, the processor is configured to determine a bank in which the entry for the store queue is located and updating the entry in the determined bank;

upon encountering a load instruction while the store instruction with the unknown destination address is deferred, determine if the load instruction is to continue executing or is to be deferred by:

determining if the load instruction would retrieve data from the bank in which the entry for the store queue is located;

when the load instruction would retrieve data from the bank, deferring the load instruction; and when the load instruction would not retrieve data from the bank, continuing executing the load instruction.

17. The method of claim 1, further comprising determining if the load instruction is to continue executing or is to be deferred by determining whether a destination address for the store corresponds to a dynamically changing region of memory that is defined by previously executed program code.

18. The method of claim 1, wherein each of the two or more banks is a separate first-in-first-out memory.

* * * * *

UNITED STATES PATENT AND TRADEMARK OFFICE
CERTIFICATE OF CORRECTION

PATENT NO. : 8,601,240 B2
APPLICATION NO. : 12/773661
DATED : December 3, 2013
INVENTOR(S) : Chaudhry et al.

Page 1 of 1

It is certified that error appears in the above-identified patent and that said Letters Patent is hereby corrected as shown below:

On the Title page, Item (54), column 1, under "Title", line 1, and in the Specification, in column 1, line 1, delete "DEFERING" and insert -- DEFERRING --, therefor.

On Title page 2, column 2, under "Other Publications", line 7, delete "Sepculative Resulution of Ambigous" and insert -- "Speculative Resolution of Ambiguous --, therefor.

In the Specification

In column 17, line 40, delete "after" and insert -- After --, therefor.

In the Claims

In column 23, line 43, in Claim 9, before "while" insert -- wherein, --.

Signed and Sealed this
Tenth Day of June, 2014

Michelle K. Lee
*Deputy Director of the United States Patent and Trademark Office*